3,199,639
SHOE DRUM BRAKES
William Robin Newton, Aldridge, England, assignor to Girling Limited, Birmingham, England, a British company
Filed Feb. 25, 1963, Ser. No. 260,559
Claims priority, application Great Britain, Mar. 16, 1962, 10,122/62
1 Claim. (Cl. 188—106)

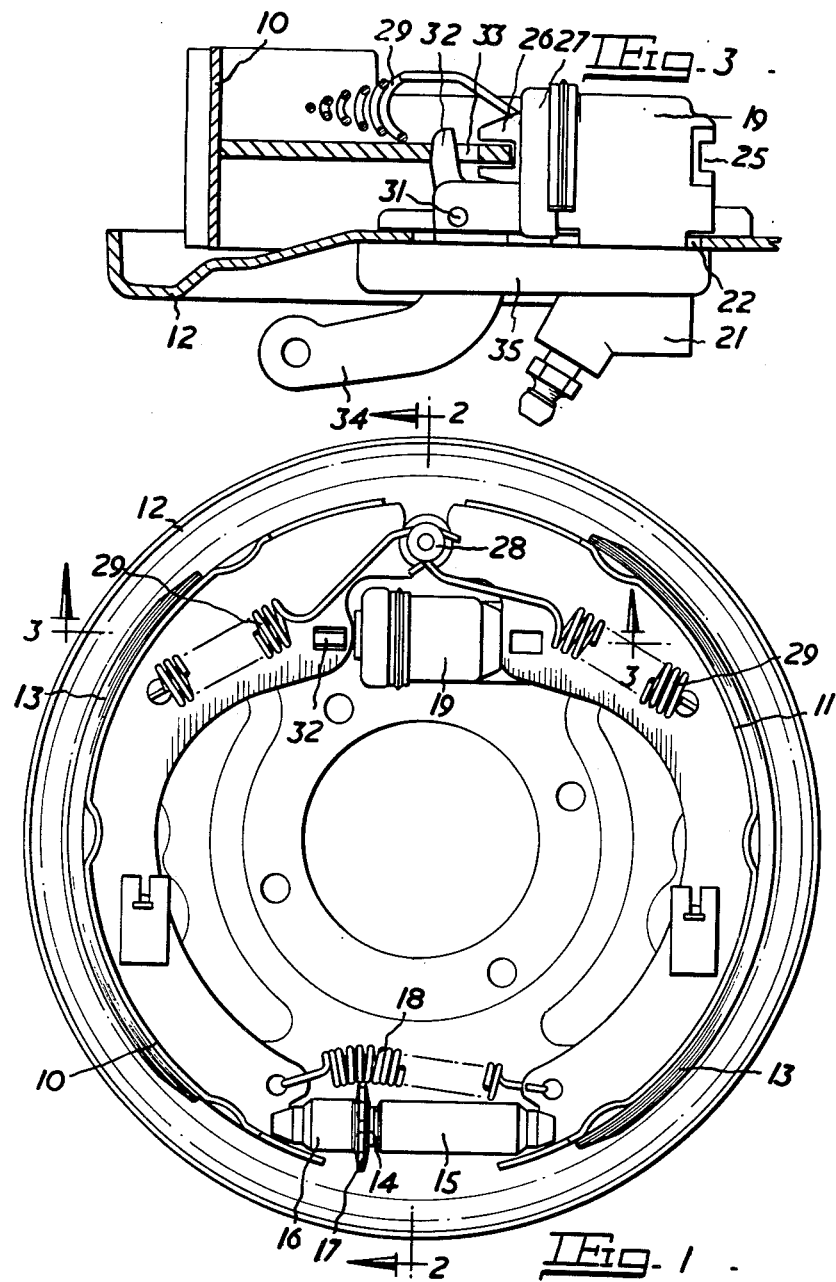

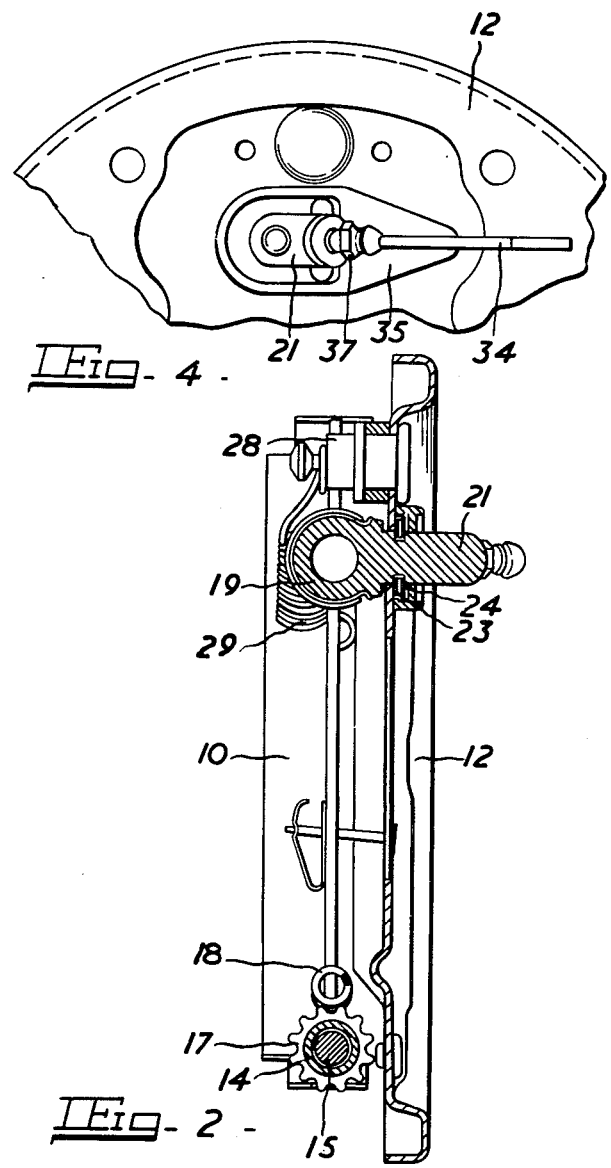

This invention relates to improvements in shoe drum brakes for vehicles of the kind in which arcuate brake shoes carrying friction linings are mounted on a stationary back plate and are adapted to be separated at one end by an actuator to bring them into engagement with a rotatable drum.

The invention relates particularly to a shoe drum brake of the duo-servo type in which the ends of the shoes remote from the actuator do not fulcrum on a stationary anchor or abutment but are articulated or otherwise connected together so that when the brake is applied and the leading shoe tends to rotate with the drum it applies a thrust to the trailing shoe which fulcrums on a stationary abutment adjacent to the actuator.

According to the invention, in a shoe drum brake of the duo-servo type the actuated ends of the shoes are separated by a single-ended hydraulic cylinder and piston assembly which is mounted on the back plate for movement in a direction substantially parallel to the direction of movement of the shoe ends in the application of the brake.

This arrangement has the advantage that the cylinder moves on the back plate to accommodate shoe movement and need only be of sufficient axial length to accommodate the mean shoe movement, whereas with a fixed double-ended cylinder the cylinder has to be of sufficient axial length to accommodate double the maximum shoe movement. Further, as the cylinder can be of small axial length less of the shoe web has to be cut away to provide room for the cylinder.

A single anchor pin for the shoes may conveniently be located on the back plate on the radially outer side of the actuator, the shoes being urged into engagement with the anchor pin by return springs.

Means may be provided for actuating the shoes mechanically from a hand-lever as well as hydraulically from a foot pedal.

One preferred form of brake in accordance with our invention is illustrated by way of example in the accompanying drawings in which:

FIGURE 1 is an end elevation of the brake without the brake drum;
FIGURE 2 is a section on the line 2—2 of FIGURE 1;
FIGURE 3 is a section on the line 3—3 of FIGURE 1;
FIGURE 4 is a fragmentary view from the outer side of the back-plate showing the hydraulic connection to the cylinder.

In the brake illustrated 10, 11 are opposed arcuate brake shoes mounted on the usual stationary back plate 12 and carrying friction linings 13 adapted to engage frictionally with a rotatable drum indicated in dotted lines in FIGURE 1.

At the non-actuated ends of the shoes the webs of the shoes are received in notches in opposite ends of a floating strut or thrust member by which the circumferential thrust of whichever shoe is acting as the leading shoe is transmitted to the other shoe. The strut is formed by two members 14, 15 which are in screw-threaded engagement with each other, and a tappet 16 with which the member 14 is in rotational engagement.

The effective length of the strut can be adjusted to compensate for wear of the friction linings by rotating the member 14 which carries a toothed wheel 17 and can be rotated by a screw-driver or like tool inserted through a hole in the back plate. The shoe webs are held in engagement with the strut by a tension spring 18 which is connected across between them and bears on the toothed wheel 17 to prevent it from rotating under vibration.

In an alternative arrangement the strut may incorporate an automatic adjuster.

The other ends of the shoes are adapted to be separated to apply the brake by an hydraulic actuator comprising a single-ended hydraulic cylinder and piston assembly 19 mounted on the back plate between the shoe ends for movement on the back plate in a direction substantially parallel to the direction of movement of the shoe ends in the application of the brake.

The cylinder has an extension 21 which extends through a slot 22 in the back plate, and a spring washer 23 backed by a retaining plate 24 is located in a peripheral groove in the extension 21 and bears against the outer surface of the back plate to locate the cylinder.

The web of the shoe 11 is received in a notch 25 in the closed end of the cylinder, and the web of the shoe 10 is received in a similar notch in an extension 26 on the outer end of a piston working in the cylinder. The extension 26 is carried through a rubber or other boot 27 which prevents the entry of dirt into the cylinder.

An abutment for the actuated ends of both shoes is formed by an anchor pin 28 fixed in the back plate on the outer side of the hydraulic cylinder.

The ends of the shoe webs are recessed to engage with the anchor pin against which they are urged by return springs 29 connected between the shoes and the pin.

For separating the shoes mechanically from a hand-lever a bell-crank lever is pivoted on a pin 31 in the cylinder assembly, the axis of the pin being parallel to the back plate. One arm 32 of the lever which is substantially at right angles to the back plate engages in a slot 33 in the web of the shoe 10 which is normally actuated by the hydraulic piston, and the other arm 34 is carried through a slot in the back plate and extends substantially parallel to the back plate. The free end of this arm is adapted to receive an actuating rod or cable which may be substantially at right angles to the back plate.

The slots in the back plate through which the bell crank lever and the extension of the cylinder pass are protected by a rubber boot 35.

When fluid under pressure from a pedal-operated master cylinder is forced into the hydraulic cylinder 19 the piston is forced outwardly to urge the shoe 10 into engagement with the drum and the reaction on the cylinder moves the cylinder assembly in the opposite direction to urge the shoe 11 into engagement with the drum. The length of the slot 33 in the web of the shoe 10 is sufficient to allow for these movements without affecting the bell crank lever.

When the brake is applied by the hand-lever the bell crank lever is moved angularly about its pivot and the arm 32 moves the shoe 10 outwardly into engagement with the drum while the reaction on the pivot pin 31 moves the hydraulic cylinder assembly in the opposite direction to urge the shoe 11 into engagement with the drum.

With this arrangement the application of the brake by the hand lever does not alter the position of the piston in the hydraulic cylinder so that the hydraulic system is not affected.

A further advantage of this arrangement is that the mechanism being located circumferentially of the hydraulic actuator does not occupy any radial space. In the normal duo-servo brake the abutment for the shoes is located radially outwards from the hydraulic actuator and the mechanical actuator is located radially inwards from the hydraulic actuator, and this necessitates a large drum or a small hub dimension. The improved construction enables a duo-servo brake with independent hydraulic and mechanical actuation to be accommodated in a drum of relatively small diameter.

I claim:

A shoe drum brake of the duo-servo type comprising a rotatable brake drum, a relatively stationary back plate, a pair of arcuate brake shoes carrying friction linings for engagement with said rotatable drum to apply the brake, said shoes having actuated and non-actuated ends, floating means operatively interconnecting the non-actuated ends of said brake shoes, and said brake applying means engaging the actuated ends of said brake shoes, said brake applying means comprising a single-ended hydraulic cylinder and piston assembly, said cylinder being in freely separable engagement with the end of one of said brake shoes and said piston being in freely separable engagement with the end of the other of said brake shoes, means slidably mounting said assembly wholly on said stationary back plate for movement in a direction substantially parallel to the direction of movement of the shoe ends in the application of the brake, an anchor pin mounted on the back plate on the radially outer-side of the hydraulic cylinder and piston assembly and forming an abutment for the actuated ends of said shoes, and means for separating said shoes mechanically comprising a bell crank lever, a pivot for said bell crank lever on said cylinder and piston assembly, one arm of said lever extending substantially at right angles to said back plate and engaging in an opening in the web of the shoe normally actuated by the piston of said cylinder and piston assembly at a point spaced circumferentially from said assembly, and the other arm of said lever extending substantially parallel to said back plate and adapted to be coupled to a hand lever.

References Cited by the Examiner
UNITED STATES PATENTS

| 2,109,091 | 2/38 | Press | 188—106 |
| 2,118,188 | 5/38 | Gallup | 188—106 |
| 2,316,450 | 4/34 | Parnell | 188—106 |

MILTON BUCHLER, *Primary Examiner.*

RALPH D. BLAKESLEE, EUGENE G. BOTZ,
*Examiners.*